US012698421B2

(12) United States Patent   (10) Patent No.: US 12,698,421 B2
Sahni et al.   (45) Date of Patent: Aug. 4, 2026

(54) POLYISOBUTYLENE ADHESIVE COMPRISING POLYOLEFIN COPOLYMER ADDITIVE

(71) Applicant: 3M INNOVATIVE PROPERTIES COMPANY, St. Paul, MN (US)

(72) Inventors: Vasav Sahni, St. Paul, MN (US); David T. Amos, St. Paul, MN (US); Jason D. Clapper, Lino Lakes, MN (US); John W. McAllister, St. Paul, MN (US); Zhong Chen, Cottage Grove, MN (US); Pierre R. Bieber, Dusseldorf (DE); Jacob P. Johnson, St. Paul, MN (US); Albert I. Everaerts, Tucson, AZ (US)

(73) Assignee: 3M Innovative Properties Company, St. Paul, MN (US)

( * ) Notice: Subject to any disclaimer, the term of this patent is extended or adjusted under 35 U.S.C. 154(b) by 677 days.

(21) Appl. No.: 16/959,539

(22) PCT Filed: Feb. 26, 2019

(86) PCT No.: PCT/US2019/019497
§ 371 (c)(1),
(2) Date: Jul. 1, 2020

(87) PCT Pub. No.: WO2019/168809
PCT Pub. Date: Sep. 6, 2019

(65) Prior Publication Data
US 2021/0071041 A1   Mar. 11, 2021

Related U.S. Application Data

(60) Provisional application No. 62/636,574, filed on Feb. 28, 2018.

(51) Int. Cl.
*C09J 7/38* (2018.01)
*C08F 110/10* (2006.01)
(Continued)

(52) U.S. Cl.
CPC ............. *C09J 7/381* (2018.01); *C08F 110/10* (2013.01); *C08K 5/01* (2013.01); *C08L 51/06* (2013.01);
(Continued)

(58) Field of Classification Search
None
See application file for complete search history.

(56) References Cited

U.S. PATENT DOCUMENTS 4,284,541 A   8/1981 Takeda et al.
6,310,134 B1 * 10/2001 Templeton ........... C09D 151/06
524/549
(Continued)

FOREIGN PATENT DOCUMENTS

CN   1653149   8/2005
CN   1890342 A   1/2007
(Continued)

OTHER PUBLICATIONS

"Standard Test Method for Water Vapor Transmission Rate of Sheet Materials Using Dynamic Relative Humidity Measurement", ASTM Standards, Designation: E398-13, 2017, pp. 1-5.
(Continued)

*Primary Examiner* — Alicia Chevalier
*Assistant Examiner* — Thomas A Mangohig
(74) *Attorney, Agent, or Firm* — Carolyn A Fischer

(57) ABSTRACT
An adhesive composition are articles are described. The adhesive composition comprises a polyisobutylene polymer component; up to 20 wt.-% of a polyolefin copolymer comprising polymerized units of an acidic monomer; and
(Continued)

optionally, at least one tackifier. The polyolefin copolymer typically comprises $C_2$-$C_4$ alkylene units. The polyolefin copolymer comprises polymerized units of a carboxylic acid, or unsaturated derivative thereof. In some embodiments, the polyolefin copolymer has a melting temperature ranging from 50 to 150° C. In some embodiments, the polyolefin copolymer has an acid number of less than 40, 35, 30, or 25 mgKOH/g.

18 Claims, 1 Drawing Sheet

(51) Int. Cl.
 *C08K 5/01* (2006.01)
 *C08L 51/06* (2006.01)
(52) U.S. Cl.
 CPC .... *C09J 2203/318* (2013.01); *C09J 2301/122* (2020.08); *C09J 2423/00* (2013.01)

(56) References Cited

U.S. PATENT DOCUMENTS

| | | | |
|---|---|---|---|
| 6,841,212 | B2 | 1/2005 | Bicakci-Jenkings |
| 7,494,707 | B2 | 2/2009 | Gotz et al. |
| 8,232,350 | B2 | 7/2012 | Fujita |
| 8,519,046 | B2 | 8/2013 | Hirose |
| 8,530,578 | B2 | 9/2013 | Bharti |
| 8,557,084 | B2 | 10/2013 | Keite-Telgenbüscher |
| 2004/0097637 | A1 | 5/2004 | Botros |
| 2005/0244601 | A1* | 11/2005 | Grund ................ A22C 13/0013 |
| | | | 428/34.9 |
| 2007/0191547 | A1 | 8/2007 | Sekiguchi |
| 2009/0026924 | A1 | 1/2009 | Leung |
| 2012/0118469 | A1 | 5/2012 | Joly et al. |
| 2012/0122359 | A1 | 5/2012 | Lee |
| 2014/0141271 | A1* | 5/2014 | Uemura ................... C08L 23/20 |
| | | | 525/191 |
| 2015/0056757 | A1 | 2/2015 | Liu |
| 2016/0068717 | A1* | 3/2016 | Gasa ...................... C09J 123/22 |
| | | | 156/331.7 |
| 2016/0200949 | A1 | 7/2016 | Lee |
| 2016/0369134 | A1 | 12/2016 | Kim |

FOREIGN PATENT DOCUMENTS

| | | |
|---|---|---|
| EP | 2172529 | 4/2010 |
| JP | 2014-231586 A2 | 12/2014 |
| WO | WO 2014-036230 | 3/2014 |
| WO | WO 2014-190151 | 11/2014 |
| WO | WO 2018-178781 | 10/2018 |
| WO | WO 2018-178850 | 10/2018 |

OTHER PUBLICATIONS

International Search Report for PCT International Application No. PCT/US2019/019497, mailed on May 24, 2019, 5 pages.

* cited by examiner

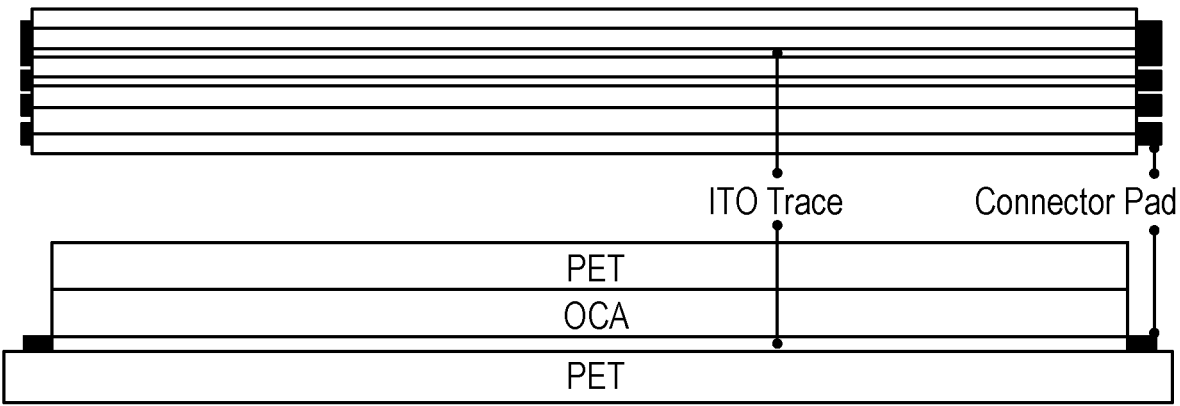
ITO Trace     Connector Pad
PET
OCA
PET

POLYISOBUTYLENE ADHESIVE COMPRISING POLYOLEFIN COPOLYMER ADDITIVE

CROSS REFERENCE TO RELATED APPLICATIONS

This application is a national stage filing under 35 U.S.C. 371 of PCT/US2019/019497, filed Feb. 26, 2019, which claims the benefit of U.S. Application No. 62/636,574, filed Feb. 28, 2018, the disclosure of which is incorporated by reference in its/their entirety herein.

BACKGROUND

Many types of input devices are presently available for performing operations in an electronic system, such as buttons, keys, mice, touch panels, touch screens and the like. Touch screens, in particular, are becoming increasingly popular because of their intuitive appeal and ease of operation. Touch screens can allow a user to perform various functions by touching the touch sensor panel. To make these devices, silver nanowire, metal mesh (e.g., Cu, Ag, Ag halide), indium tin oxide (ITO) alternatives, are increasingly being utilized. The non-ITO based conducting films have low resistance relative to ITO transparent electrodes which have high electrical resistance issues in large sized touch application.

Even with lower resistance and cheaper manufacturing cost, the metal based materials are well known to be susceptible to electrochemical oxidation with an oxidant such as oxygen and moisture. The oxidation and the electromigration between silver or copper traces when under current flow and in elevated temperature/high humidity environment (i.e. 65 degrees C. and 90% humidity) will cause connectivity issues in the electro-conductive trace. Indeed, metallic migration between traces can cause so-called dendritic growth and bridging between traces, which eventually short the circuit. In contrast, corrosion can disrupt the traces and thus the current passing through them.

Organic Light emitting diodes (OLEDs) are increasingly being utilized in displays and light sources because of their lower power consumption, higher response speed and excellent space utilization. The OLED element is very sensitive to moisture or oxygen. The organic luminescent material easily loses its luminescence once it is exposed to moisture, and the highly reactive cathode with low work function will be easily corroded by moisture and oxygen.

SUMMARY

Although various adhesive compositions that are suitable for electronic have been developed, industry would find advantage in adhesive compositions that exhibit improved properties.

In one embodiment, an adhesive composition is described comprising a polyisobutylene polymer component; up to 20 wt.-% of a polyolefin copolymer comprising polymerized units of an acidic monomer; and optionally, at least one tackifier.

The polyolefin copolymer typically comprises $C_2$-$C_4$ alkylene units. The polyolefin copolymer comprises polymerized units of a carboxylic acid, or unsaturated derivative thereof. In some embodiments, the polyolefin copolymer has a melting temperature ranging from 50 to 150° C. In some embodiments, the polyolefin copolymer has an acid number of less than 40, 35, 30, or 25 mgKOH/g. The adhesive composition can exhibit improved adhesion, especially to metal substrates. The adhesive composition preferably has low haze and/or a low moisture vapor transmission rate.

In another embodiment, an article is described comprising the adhesive composition, described herein, disposed on a substrate or between two substrates. In some embodiments, the one or more of the substrates is an optical film, a display unit, a touch sensor, or a lens.

BRIEF DESCRIPTION OF THE FIGURE

FIG. 1 is a top view of a sample construction for patterned ITO polyester film resistance change measurement.

This FIGURE is not drawn to scale and is intended merely for illustrative purposes.

DETAILED DESCRIPTION

To protect the touch sensor and OLED in an electronic device, a low water vapor transmission rate (WVTR), low moisture content, and low dielectric constant (Dk) adhesive or optically clear adhesive (e.g. OCA) is described, which can be directly integrated into an electronic device to protect sensor and display from moisture, temperature, foreign materials or chemical penetration. The adhesive or OCA has a low water vapor transmittance rate (WVTR), low moisture content, low dielectric constant (Dk), and optional ultraviolet (UV) blocking features. Even with low WVTR and low moisture content, the adhesive or OCA retains its optical quality during durability testing, i.e., it retains high visible light transmission and low haze. Since the OCA retains high visible light transmission and low haze, it can advantageously be used in the visible area of the touch sensor panel. Additionally, the OCA described herein provides good compliance, imparts corrosion protection, and provides flow properties to cover the sensor trace, flexible printed circuits (FPC) and any display cover ink step.

Presently described is an adhesive composition comprising a polyisobutylene polymer component. The polyisobutylene polymer component comprises one or more polyisobutylene polymers. Such polyisobutylene polymers may be homopolymers and/or copolymers. Unless specified otherwise, as used herein "polyisobutylene polymer" refers to both the homopolymer and copolymer.

In some embodiments, the adhesive composition is a pressure sensitive adhesive. Pressure sensitive adhesives are often characterized as having a storage modulus (G') at the application temperature, typically room temperature (e.g. 25° C.), of less than $3 \times 10^5$ Pa (0.3 MPa) at a frequency of 1 Hz. As used herein, storage modulus (G') refers to the value obtained utilizing Dynamic Mechanical Analysis (DMA) per the test method described in U.S. patent application Ser. No. 62/479,527, filed Mar. 31, 2017. In some embodiments, the pressure sensitive adhesive composition has a storage modulus of less than $2 \times 10^5$ Pa, $1 \times 10^5$ Pa, $9 \times 10^4$ Pa, $8 \times 10^4$ Pa, $7 \times 10^4$ Pa, $6 \times 10^4$ Pa, $5 \times 10^4$ Pa, $4 \times 10^4$ Pa, or $3 \times 10^4$ Pa. In some embodiments, the composition has a storage modulus (G') of at least $2.0 \times 10^4$ Pa or $2.5 \times 10^4$ Pa.

Pressure sensitive adhesives are often characterized as having a glass transition temperature "Tg" below 25° C.; whereas other adhesives may have a Tg of 25° C. or greater, typically ranging up to 50° C. As used herein, Tg refers to the value obtained utilizing DMA per the test method described in the examples. In some embodiments, the pressure sensitive adhesive composition has a Tg no greater than 20° C., 15° C., 10° C., 5° C., 0° C., or −5° C. The Tg of the pressure sensitive adhesive is typically at least −40° C., −35° C., −30° C., −25° C., or −20° C.

Pressure sensitive adhesive are often characterized as having adequate adhesion. In some embodiments, the peel adhesion (e.g. to aluminum), as measured according to the test method described in the examples, is at least 0.1, 0.5, 1, 2, 3, 4, or 5 N/dm ranging up to for example 15, 16, 17, 18, 19, or 20 N/dm, or greater.

In some embodiments, the polyisobutylene polymer component comprises a polyisobutylene polymer comprising at least 90, 91, 92, 93, 94, 95, 96, 97, 98, or 99 mole-% of polymerized units of isobutylene.

In other embodiments, the polyisobutylene polymer component comprises a polyisobutylene copolymer that comprises at least 50, 55 or 60 mole-% of polymerized units of polyisobutylene. In some embodiments, the copolymer further comprises polymerized units derived from 1-butene and/or 2-butene. The polymerized units derived from 1-butene and/or 2-butene are typically present in an amount of at least 1, 5, 10, 15 or 20 mole-% ranging up to 30, 35, 40, 45 or 50 wt.-% of the polyisobutylene copolymer. Polyisobutylene copolymers further comprising polymerized units derived from 1-butene and/or 2-butene may be characterized as "polybutene".

The polyisobutylene polymer component may contain at least two polymers where the first polyisobutylene polymer comprises a higher concentration of polymerized units derived from 1-butene and/or 2-butene than the second polyisobutylene polymer.

Other examples polyisobutylene copolymers include copolymers of isobutylene and isoprene, copolymers of isobutylene and butadiene, and halogenated butyl rubbers obtained by brominating or chlorinating these copolymers. However, the polyisobutylene copolymers can be free of halogenated butyl rubbers, the halogen (e.g. chloride, bromide) content being less than 1, 0.5, 0.25, 0.1, 0.01, or 0.001 mole percent of the polyisobutylene polymer.

The polyisobutylene copolymer typically does not contain a structural unit derived from styrene. Further, the polyisobutylene copolymers are typically random copolymers. Such characteristic(s) distinguish polyisobutylene copolymer from the styrene isobutylene block copolymer component.

Thus, depending on the selection of polyisobutylene polymer(s), the polyisobutylene polymer component comprises at least 50, 55, 60, 65, 70, 75, 80, 85, 90, 95 wt.-% or greater of polymerized units of polyisobutylene.

Polyisobutylene polymer(s) can contain a trace amount of C8-C28 oligomers. The concentration of such is generally less than 0.15, 0.10, or 0.05 wt.-% based on the total weight of the polyisobutylene polymer.

It is appreciated that the polyisobutylene polymer(s) may have a very small concentration of reactive double bonds or other functional groups that are residual of the polymerization method of making the polyisobutylene polymer. The concentration of such reactive double bonds or other functional groups is typically less than 5, 4, 3, or 2 mole %.

Polyisobutylene polymer(s) typically have a density of 0.92 g/cc. However, depending on the content of 1-butene and/or 2-butene and/or other alkene comonomer(s), the density may be 0.91 or lower. Further, the glass transition temperature of such polymers is typically −64° C. to −65° C. as measured by Differential Scanning Calorimetry (DSC). Polyisobutylene polymer(s) typically cold flow at room temperature.

Polyisobutylene polymers are commercially available from several manufacturers. Homopolymers are commercially available, for example, under the trade designation OPPANOL (e.g., OPPANOL B12, B15, B30, B50, B80, B100, B150, and B200) from BASF Corp. (Florham Park, N.J.). These polymers often have a weight average molecular weight in the range of about 40,000 to 1,000,000 g/mole or greater. Still other polyisobutylene polymers are commercially available in a wide range of molecular weights from United Chemical Products (UCP) of St. Petersburg, Russia; Exxon Chemical Company as the trade designation VISTANEX™; and B.F. Goodrich as the trade designation "Hycar". Such polyisobutylene polymers are characterized as unfunctional polyisobutylene polymers, lacking functional groups such as amine, imide, and anhydride.

In some embodiments, the adhesive composition comprises little or no polyisobutylene polymers that include functional groups. Thus, the concentration of functionalized polyisobutylene polymer(s) is typically less than 1 wt.-% of the adhesive composition. In this embodiment, the polyolefin copolymer is not covalently bonded to the polyisobutylene polymer component.

In some embodiments, the polyisobutylene component further comprises polyisobutylene polymers that include functional groups. Various functionalized PIB materials are commercially available. For example, polyisobutyleneamine having a number average molecular weight (Mn) of about 1,000 grams/mole and a molar mass distribution Mw/Mn=1.6) is commercially available from BASF Corporation (Florham Park, N.J.) under the trade designation "Kerocom™ PIBA03". Further, polyisobutene succinimide is available from BASF under the trade designation "Kerocom™ PIBSI". An anhydride-terminated polyisobutylene (Mn) of about 1,000 grams/mole) is available from BASF under the trade designation "Glissopal SA". Such materials can optionally be present in the adhesive composition at a concentration ranging from 1, 2, 3, 4, 5, 6, 7, 8, 9, or 10 wt.-% ranging up to 40 wt.-% of the adhesive composition. Depending on the functional group, the polyolefin copolymer may or may not be covalently bonded to the functional polyisobutylene polymer.

In typical embodiments, the polyisobutylene component includes a blend of two or more polyisobutylene polymers, wherein each polyisobutylene polymer has a different weight average molecular weight (Mw). As used herein, all weight-average molecular weights are based on Gel Permeation Chromatography (GPC) utilizing polystyrene standards, per the test method described in previously cited U.S. patent application Ser. No. 62/479,527, filed Mar. 31, 2017.

For example, in some embodiments, polyisobutylene component includes a blend of a higher molecular weight polyisobutylene polymer (i.e. Mw greater than 300,000 g/mole) and an intermediate molecular weight polyisobutylene polymer (i.e. Mw less than 150,000 or 100,000 g/mole).

When the polyisobutylene component includes two or more polyisobutylene polymers, the average weight average molecular weight of the component can be approximated by the summation of the average molecular weight of each polyisobutylene polymer multiplied by the weight fraction of each polyisobutylene polymer within the polyisobutylene component. For example, if the polyisobutylene component contains about 64 wt.-% of a first polyisobutylene polymer having a weight average molecular weight of 75,000 and about 36 wt.-% of a second polyisobutylene polymer having a weight average molecular weight of 750,000 g/mole, the average weight average molecular weight can be approximated as $75,000 \times 0.64 + 750,000 \times 0.36 = 318,000$ g/mole. Thus, in some embodiments, the polyisobutylene polymer component can comprise one or more polyisobutylene polymers such that the polyisobutylene polymer component has an average weight average molecular weight (Mw) is at least 150,000 g/mole, 200,000 g/mole, or 250,000 g/mole and ranging up to 400,000 g/mole; 450,000 g/mole to 500,000 g/mole. More than one low molecular weight PIB and more than one high molecular weight can be used.

In some embodiments, the amount of intermediate molecular weight is equal to or greater than the amount of high molecular weight based on the total weight of the polyisobutylene component. For example, the amount of intermediate molecular weight may be at least 50, 55, 60, 65, 70 or 75 wt.-% of the polyisobutylene component. In this embodiment, the amount of higher molecular weight may be at least 25, 30, 35, 40, 45 or 50 wt.-% of the polyisobutylene component.

The adhesive or OCA typically comprises at least 40, 45, or 50 wt.-% of polyisobutylene component. In some favored embodiments the adhesive or OCA comprises at least 55, 60, 65, 70, or 75 wt.-% of polyisobutylene component. The polyisobutylene polymer component provides the desired water vapor transmission rate (WVTR) properties. In some embodiments, the WVTR of a 51 micron adhesive layer is less than 20 or 15 or 10 grams/square meter/day (g/sq·m/day) at 40° C. and 90% relative humidity gradient. In other words, the WVTR can be at least 0.2, 0.25, 0.3, 0.35, or 0.4 g/sq·m/day per micron thickness of adhesive. In other embodiments, the WVTR of a 20 micron adhesive layer at 40° C. and a relative humidity gradient is less than 100, 75, 50, 25, 20, or 15 $g/m^2$/day.

The combination of the intermediate and high-molecular weight PIB resins is particularly advantageous as the combination provides a broad range of desirable characteristics. The intermediate molecular weight PIB facilitates processing during hot melt extruding, by lowering the melt viscosity of the compounded adhesive mixture. In solvent processing, the intermediate molecular weight facilitates faster diffusion of solvent during drying, thus enabling thicker coatings. Also, the intermediate molecular weight PIB imparts conformability to an OCA which enables ink step coverage, and proper wet-out on different surfaces, which are critical features in OCAs. High molecular weight imparts cohesion to an adhesive system which improves the adhesive forces, shear strength, tensile strength, room temperature and high temperature dimensional stability. These properties are critical for OCAs and differing applications may require broad range of composition to accommodate the particular characteristic for each particular application.

The adhesive or OCA further comprises a polyolefin copolymer. The polyolefin copolymer is generally miscible with the polyisobutylene component such that improved adhesion in combination with low haze can be achieved.

In some embodiment, the polyolefin of the copolymer may be obtained by copolymerizing ethylene or alpha-olefin using Ziegler-Natta catalyst or a metallocene catalyst as a polymerization catalyst. The polyolefin of the copolymer typically comprises polymerized units of $C_2$-$C_4$ alkylenes. In some embodiments, the polyolefin comprises polypropylene and may be characterized as a propylene-based random copolymer such as ethylene-propylene copolymers, propylene-butene copolymers and ethylene-propylene-butene copolymers. In some embodiments, the polyolefin copolymer comprises at least 60 mol %, 70 mol %, or 80 mol % propylene based on the total polyolefin copolymer.

In some embodiments, the polyolefin of the copolymer has a weight average molecular weight of at least 10,000; 20,000; 30,000; 40,000; or 50,000 g/mole. The weight average molecular weight of the polyolefin of the copolymer is typically no greater than 500,000; 400,000; 300,000 or 200,000 g/mole.

The polyolefin copolymer further comprises polymerized units of an ethylenically unsaturated carboxylic acid, or derivative (e.g. anhydride) thereof. The inclusion of such acidic groups is believed to improve adhesion.

In some embodiments, the polyolefin copolymer has an acid number of less than 40, 35, 30, or 25 mgKOH/g. The acid value can be determined by the titration with a base, and is defined as a value (milligram) of base (e.g. potassium hydroxide) required for neutralizing 1 g of the polymer. When the concentration of carboxylic acid, and unsaturated derivatives thereof is too high, the polyolefin copolymer can be immisible with the polyisobutylene component resulting is phase separation, inadequate adhesion, and/or high haze.

Examples of ethylenically unsaturated carboxylic acids, and (e.g. unsaturated) derivatives thereof including anhydrides include fumaric acid, maleic acid, itaconic acid, citraconic acid, aconitic acid, nadic acid, and their anhydrides, methyl fumarate, ethyl fumarate, propyl fumarate, butyl fumarate, dimethyl fumarate, diethyl fumarate, dipropyl fumarate, dibutyl fumarate, methyl maleate, ethyl maleate, propyl maleate, butyl maleate, dimethyl maleate, diethyl maleate, dipropyl maleate, dibutyl maleate, maleimide and N-phenylmaleimide, and are preferably itaconic anhydride and maleic anhydride. Combination ethylenically unsaturated carboxylic acid(s) and (e.g. unsaturated) derivative(s) thereof may be utilized.

The polyolefin copolymer is preferably chlorine free, having a chlorine content less than 1, 0.5, 0.1, 0.01, or 0.001 wt.-%. When the polyolefin copolymer has a sufficiently low chlorine content, the OCA does not yellow during use. The adhesive composition is also chlorine free as just described.

In some embodiments, the polyolefin copolymer optionally further comprises polymerized units of at least one (meth)acryl monomer. Examples include methyl(meth)acrylate, ethyl(meth)acrylate, n-butyl(meth)acrylate, cyclohexyl (meth)acrylate, isobornyl(meth)acrylate, glycidyl(meth) acrylate, octyl(meth)acrylate, lauryl(meth)acrylate, tridecyl (meth)acrylate, stearyl(meth)acrylate, benzyl(meth)acrylate, phenyl(meth)acrylate, N,N-dimethylaminoethyl (meth)acrylate, N,N-diethylaminoethyl(meth)acrylate, 2-hydroxyethyl (meth)acrylate, acetoacetoxyethyl(meth)acrylate, N-methyl (meth)acrylamide, N-ethyl(meth)acrylamide, N-propyl (meth)acrylamide, N-isopropyl(meth)acrylamide, N-butyl (meth)acrylamide, N-isobutyl(meth)acrylamide, N-t-butyl (meth)acrylamide, N,N-dimethyl(meth)acrylamide, N,N-dimethylaminopropyl(meth)acrylamide, N,N-methylene-bis (meth)acrylamide, N-methylol(meth)acrylamide, hydroxyethyl(meth)acrylamide, (meth)acryloyl morpholine, n-butylvinyl ether, 4-hydroxybutylvinyl ether and dodecylvinyl ether. Monomers including acrylamide or amino group also typically contribute to improved adhesion. Long chain alkyl (e.g. $C_6$-$C_{20}$ or $C_6$-$C_{12}$) (meth)acrylates can contribute to improved compatability with the polyisobutylene of the adhesive.

In some embodiments, the polyolefin copolymer optionally comprises polymerized units of a (meth)acryl monomer. When present, the concentration of (meth)acryl monomer is typically at least 0.01 0.1, 0.5, or 1 wt.-% and no greater than 30 wt. % or 20 wt.-% of the polyolefin copolymer. In some embodiments, the concentration of (meth)acryl monomer is less than 1, 0.5, 0.1, or 0.01 wt.-% of the polyolefin copolymer. The concentration (meth)acryl monomer can be obtained by the Fourier transform infrared spectroscopy or $^1$H-NMR.

The polyolefin copolymer can be prepared according to methods known in the art. (See for examples U.S. Pat. No. 8,519,046; incorporated herein by reference.) In some embodiments, the polyolefin copolymer may be characterized as a propylene-based random copolymer comprising grafted carboxylic acid (e.g. maleic) anhydride and (meth) acryl monomer.

In some embodiment, the polyolefin copolymer has a melting temperature of 50 to 150° C. as measured according to DSC at a rate of 10 degrees ° C./minute. In some embodiments, the onset of melting temperature is at least 55 or 60° C. In some embodiments, melting temperature is no greater than 100, 90 or 80° C.

Suitable polyolefin copolymer materials are commercially available from Nippon Paper Group, Japan under the trade designations "AUROREN 350S" and "AUROREN 353S".

The adhesive composition may optionally comprise one or more additives such as tackifiers, plasticizers (e.g. oils, polymers that are liquids at 25° C.), antioxidants (e.g., hindered phenol compounds, phosphoric esters, or derivatives thereof), ultraviolet light absorbers (e.g., benzotriazole, oxazolic acid amide, benzophenone, or derivatives thereof), in-process stabilizers, anti-corrosives, passivation agents, processing aids, elastomeric polymers (e.g. block copolymers), scavenger fillers, nanoscale fillers, transparent fillers, desiccants, crosslinkers, pigments, etc. These additives may be used singly and in combination of two or more kinds thereof. The total concentration of such additives ranges from 0-60 wt.-% of the total adhesive composition.

When it is desired for the adhesive composition to be transparent, the adhesive is typically free of fillers having a particle size greater than 100 nm that can detract from the transparency of the adhesive composition. In this embodiment, the total amount of filler of the adhesive composition is no greater than 10, 9, 8, 7, 6, 5, 4, 3, or 2 wt.-% solids of the adhesive composition. In some favored embodiments, the adhesive composition comprises no greater than 1, 0.5, 0.1, or 0.05 wt.-% of filler.

However, in other embodiments, the adhesive composition may comprise higher amounts of inorganic oxide filler such as fumed silica.

In typical embodiments, the adhesive composition does not comprise acid-reactive components such as epoxy compounds that would result in crosslinking of the acid groups.

In typical embodiments, the adhesive composition does not comprise styrene-isoprene-styrene (SIS) and/or styrene-butadiene-styrene (SBS) block copolymers.

The adhesive or OCA compositions disclosed herein may optionally comprise a tackifier. Addition of tackifiers allows the composition to have higher adhesion which can be beneficial for some applications where adhering to different substrates is a critical requirement. The addition of tackifiers increases the Tg of the composition and can reduce its storage modulus at room temperature, thus making it less elastic and more flowable, such as what is required for compliance to an ink step during lamination. However, that same addition of a tackifier can shift the visco-elastic balance too much towards the viscous behavior, such as in those cases where minimal creep and thus less flow is required. The addition of tackifiers is thus optional, and its presence and concentration are dependent on the particular application.

Suitable tackifiers include hydrocarbon resins and hydrogenated hydrocarbon resins, e.g., hydrogenated cycloaliphatic resins, hydrogenated aromatic resins, or combinations thereof. Suitable tackifiers are commercially available and include, e.g., those available under the trade designation ARKON (e.g., ARKON P or ARKON M) from Arakawa Chemical Industries Co., Ltd. (Osaka, Japan); those available under the trade designation ESCOREZ (e.g., ESCOREZ 1315, 1310LC, 1304, 5300, 5320, 5340, 5380, 5400, 5415, 5600, 5615, 5637, and 5690) from Exxon Mobil Corporation, Houston, TX; and those available under the trade designation REGALREZ (e.g., REGALREZ 1085, 1094, 1126, 1139, 3102, and 6108) from Eastman Chemical, Kingsport, TN. Because of their low color and environmental stability, these tackifiers are particularly advantageous for OCA type applications.

The tackifier can have any suitable softening temperature or softening point. The softening temperature is often less than 200° C., less than 180° C., less than 160° C., less than 150° C., less than 125° C., or less than 120° C. In applications that tend to generate heat or where the adhesive bond is exposed to heat, however, the tackifier is often selected to have a softening point of at least 75° C. Such a softening point helps minimize separation of the tackifier from the rest of the adhesive composition when the adhesive composition is subjected to heat such as from an electronic device or component. The softening temperature is often selected to be at least 80° C., at least 85° C., at least 90° C., or at least 95° C. In applications that do not generate heat or the adhesive bond is not exposed to heat, however, the tackifier can have a softening point less than 75° C.

In some embodiments the adhesive composition comprises a tackifier. The concentration of tackifier can vary depending on the intended (e.g. pressure sensitive) adhesive composition. In some embodiments, the amount of tackifier is at least 1, 2, 3, 4, 5, 6, 7, 8, 9, 10, 11, 12, 13, 14, 15 wt.-%. The maximum amount of tackifier is typically no greater than 60, 55, 50, 45, 40, 35, or 30 wt.-%. Increasing the (e.g. solid at 25° C.) tackifier concentration typically raises the Tg of the adhesive. In other embodiments, the adhesive composition comprises little or no tackifier. Thus, the concentration of tackifier is less than 5, 4, 3, 2, 1, 0.5, or 0.1 wt.-%.

In addition, liquid rheology modifiers, such as plasticizers or oils may also be used. For example, mineral oil (Kaydol), napthenic oil (Calsol 5550), and paraffinic oil (Hyprene P100N) may be used. The benefit of using a plasticizer/oil in combination with a tackifier is that it allows one to reduce the glass transition temperature of the composition in addition to reducing the storage modulus of the composition. This imparts higher flow characteristics to the composition which is advantageous in applications where conformability to features like ink steps, flex connects etc., is required. In applications requiring defect-free lamination coverage of an ink-step, adhesive compositions with a higher creep compliance are known to provide better ink-step coverage. A creep compliance of greater than $1.5 \times 10^4$ 1/Pa has been found most desirable for optimal lamination coverage on commercial ink-step features.

The adhesive or OCA compositions disclosed herein may further include a UV blocking agent. The UV blocking package includes UV absorbents or combination of UV absorbents and light stabilizers. Examples of suitable UV absorbers include, but are not limited to, benzophenone, benzotriazole, triazines or combination of them. Examples of light stabilizers include, but are not limited to, hindered amine light stabilizers (HALS). The adhesive sheet of the present invention has neutral color and low haze, which is required for the optically clear adhesive. The adhesive sheet of this invention has a sharp UV cut-off, examples of UV cut-off include, but are not limited to, transmittance (% T) less than 1.5% at 380 nm wavelength, 84% at 400 nm wavelength and higher than 96% at 410 nm wavelength and above, which can block UV light or even purple or blue light efficiently, but does not cause too much yellow color.

In some embodiments, the adhesive compositions are prepared by dissolving the polyisobutylene polymer, and other optional components in an organic solvent. Suitable solvents include for example alkanes, ethyl acetate, toluene and tetrahydrofuran. In other embodiments, the adhesive composition may be characterized as hot-melt adhesive. Such adhesive composition are typically applied from the melt and are solvent-free. Alternatively, a solidified hot melt or dried solvent based adhesive may be applied to a substrate or between substrates. The adhesive may be heated after application to the substrate as will subsequently be described.

The thickness of the adhesive layer is typically at least 10, 15, 20, or 25 microns (1 mil) ranging up to 500 microns (20 mils) thickness. In some embodiments, the thickness of the adhesive layer is no greater than 400, 300, 200, or 100 microns. The adhesive composition can be coated in single or multiple layers. The layers may be continuous or discontinuous.

The adhesive composition may be coated upon a variety of flexible and inflexible backing materials using conventional coating techniques to produce a single coated or double coated adhesive tape, and adhesive transfer tapes. Generally, adhesive transfer tapes comprise a layer of adhesive disposed on a release liner. Such products can be formed by applying (e.g., coating, casting, or extruding) the adhesive onto a release liner, and drying the adhesive if an organic solvent in present.

The tape may further comprise a release material or release liner. For example, in the case of a single-coated tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, a second layer of adhesive is disposed on the opposing surface of the backing surface. The second layer may also comprises the adhesive composition as described herein or a different adhesive composition.

Flexible substrates are defined herein as any material which is conventionally utilized as a tape backing or may be of any other flexible material. Examples include, but are not limited to polymeric films, woven or nonwoven fabrics (e.g. scrim); metal foils, foams (e.g., polyacrylic, polyethylene, polyurethane, neoprene), and combinations thereof (e.g. metalized polymeric film). Polymeric film include for example polypropylene (e.g. biaxially oriented), polyethylene (e.g. high density or low density), polyvinyl chloride, polyurethane, polyester (polyethylene terephthalate), polycarbonate, polymethyl(meth)acrylate (PMMA), polyvinylbutyral, polyimide, polyamide, fluoropolymer, cellulose acetate, cellulose triacetate, and ethyl cellulose. The woven or nonwoven fabric may comprise fibers or filaments of synthetic or natural materials such as cellulose (e.g. tissue), cotton, nylon, rayon, glass, ceramic materials, and the like.

A substrate may be bonded by the adhesive composition or (e.g. transfer, single-sided, or double-coated tape described herein. The substrate may comprise the same materials as just described for the backing.

One method of bonding comprises providing a first substrate and contacting a surface of the first substrate with the (e.g. pressure sensitive) adhesive. In this embodiment, the opposing surface of the adhesive is typically temporarily covered by a release liner.

In other embodiments, the method further comprises contacting the opposing surface of the (e.g. pressure sensitive) adhesive (e.g. layer) to a second substrate. The first and second substrate may be comprised of various materials as previously described such as metal, an inorganic material (e.g. glass), an organic polymeric material, or a combination thereof.

In some methods of bonding, the substrate, (e.g. pressure sensitive) adhesive composition, or combination thereof may be heated to reduce the storage modulus (G') and thereby increase the bond strength formation. The substrate and/or (e.g. pressure sensitive) adhesive may be heated to a temperature up to 30, or 35, or 40, or 45, or 50, or 55, or 60, or 65 or 70° C. In some embodiments, the substrate(s) together with the adhesive bonded to the substrate(s) by means of the initial peel adhesion strength at ambient temperature (e.g. 25° C.) is heated in an oven to the desired temperature. In other embodiments, the substrate and/or (e.g. pressure sensitive) adhesive is heated by means of a hot air gun.

In some embodiments, the (e.g. pressure sensitive) adhesive composition described herein is optically clear. Thus, certain articles can be laminates that include an optically clear substrate (e.g., an optical substrate such as an optical film) and an optically clear adhesive layer disposed on at least one major surface of the optically clear substrate. The laminates can further include a second substrate permanently or temporarily attached to the pressure-sensitive adhesive layer and with the pressure-sensitive adhesive layer being positioned between the optically clear substrate and the second substrate.

In one embodiment, the laminate may be a removable or permanent surface protection film. In some embodiments, the tapes and protective films can be utilized for (e.g. illuminated) displays that can be incorporated into household appliances, automobiles, computers (e.g. tablets), and various hand-held devices (e.g. phones). In other embodiments, the adhesive coated film may be suitable for architectural applications, glazing (e.g., windows and windshields), and graphic film applications.

In some embodiments, the (e.g. pressure sensitive) adhesive and optically clear substrate (e.g. transparent film) have a transmission as measured according to the test method described in the examples of visible light (410 nm) of at least 90 percent for a layer of adhesive having a thickness of 50 micrometers. In some embodiments, the transmission is at least 91, 92, 93, 94, 95, 96, 97, 98, or 99%.

In some example laminates in which an optically clear pressure-sensitive adhesive layer is positioned between two substrates, at least one of the substrates is an optical film, a display unit (e.g., liquid crystal displays (LCDs), organic light emitting displays (OLEDs), a touch sensor, or a lens. Optical films intentionally enhance, manipulate, control, maintain, transmit, reflect, refract, absorb, retard, or otherwise alter light that impinges upon a surface of the optical film. Optical films included in the laminates include classes of material that have optical functions, such as polarizers, interference polarizers, reflective polarizers, diffusers, colored optical films, mirrors, louvered optical film, light control films, transparent sheets, brightness enhancement film, anti-glare, and anti-reflective films, and the like. Optical films for the provided laminates can also include retarder plates such as quarter-wave and half-wave phase retardation optical elements. Other optically clear films can include clear plastics (such as polyester, cyclic olefin copolymer, clear polyimide, polycarbonate, or polymethylmethacrylate), anti-splinter films, and electromagnetic interference filters. Some of these films may also be used as substrates for ITO (i.e., indium tin oxide) coating or patterning, such as use those used for the fabrication of touch sensors. The low water uptake and WVTR of the adhesives described herein provide a stable, low dielectric constant OCA which can be very advantageous for use in touch sensor applications, both to protect the sensor and integrating conductors from the environment and corrosion, and also to minimize electronic noise communication with the sensor. In some embodiments, the (e.g. pressure sensitive) adhesive and (e.g. transfer and double-coated) tapes described herein are suitable for bonding internal components or external components of an optical elements such as illuminated display devices such as liquid crystal displays ("LCDs") and light emitting diode ("LEDs") displays such as cell phones (including Smart phones), wearable (e.g. wrist) devices, car navigation systems, global positioning systems, depth finders, computer monitors, notebook and tablet computer displays. Other such adhesives and adhesive articles. All percents are by weight unless otherwise indicated.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis.

Materials

The materials with their sources were as listed in Table 1. Unless stated otherwise, all other reagents were obtained, or are available from fine chemical vendors such as Sigma-Aldrich Company, St. Louis, Missouri, or may be synthesized by known methods.

TABLE 1

| DESIGNATION | DESCRIPTION | SOURCE |
|---|---|---|
| OB15 | Polyisobutylene (molecular weight ~75 kilograms/mole) obtained under the trade designation OPPANOL B15 SFN | BASF Corporation, Florham Park, NJ |
| AP125 | Hydrogenated hydrocarbon resin obtained under the trade designation ARKON P125 | Arakawa, Chicago, IL |
| OB80 | Polyisobutylene (molecular weight ~750 kilograms/mole) obtained under the trade designation OPPANOL B80 | BASF Corporation, Florham Park, NJ |
| A250S | Acrylic modified polyolefin, high functionality; obtained under the trade designation AUROREN 250S | Nippon Paper Group, Japan |
| A350S | Acrylic modified polyolefin, medium functionality; obtained under the trade designation AUROREN 350S | Nippon Paper Group, Japan |
| A353S | Acrylic modified polyolefin, low functionality; obtained under the trade designation AUROREN 353S | Nippon Paper Group, Japan |
| RF22N | Release liner obtained under the trade designation RF 22N | SKC Haas, Korea |
| RF02N | Release liner obtained under the trade designation RF 02N | SKC Haas, Korea |
| Heptane | Heptane (solvent) | EMD Millipore Corp., Billerica, MA | types of optical elements include projection (e.g. lens) components, photonic components, and polarizing beam splitters.

In some embodiments, the (e.g. pressure sensitive) adhesive is suitable for use as an encapsulating composition for use in an electronic device as described for example in US2009/0026924; incorporated herein by reference.

Specifically, the (e.g. pressure sensitive) adhesive can be used as a sealing member for electronic devices, for example, organic devices such as an organic transistor, an organic memory, and an organic EL element; liquid crystal displays; electronic paper; thin film transistors; electrochromic devices; electrochemical light-emitting devices; touch panels; solar batteries; thermoelectric conversion devices; piezoelectric conversion devices; electric storage devices; and the like.

In addition to various optics-related applications and/or electronic display assembly applications, the adhesive composition described herein can be used in a variety of other articles. The following, non-limiting, examples further describe exemplary adhesives and adhesive articles of the present disclosure, as well as exemplary methods for making

Test Methods

Method for Haze Measurement

Test specimens were prepared by cleaning the LCD (liquid crystal display) glass three times with IPA (isopropyl alcohol) and completely drying the surface with a KIM-WIPE (KIMTECH by Kimberly-Clark, Irving, TX). Each test specimen was cut to a size large enough to cover the entrance port. The clear liner was removed and the adhesive was laminated on the LCD glass with four passes of a small rubber hand roller. The sample should be free of visible distinct internal voids, particles, scratches, and blemishes. Then test sample was then placed in a 65° C., 90% relative humidity testing chamber. After 10 minutes, the other clear liner was removed and the haze was measured according to ASTM D 1003-92 against the background of the LCD glass with UltraScan Pro (Hunterlab, Reston, VA).

Method for Determination of the Water Vapor Transmission Rate (WVTR)

Water Vapor Transmission Rate was measured according to ASTM E398-13 using a PERMATRAN-W 1/50 G testing instrument setup from Mocon (Brooklyn Park, MN). The test conditions were 40° C. and 90% relative humidity gradient.

180° Peel Test at Room Temperature at 300 Millimeters/ Minute on Aluminum

Single layer pressure sensitive adhesive films were laminated prior to testing on a 50 micrometer (μm) thick PET backing (obtained under the trade designation HOS-TAPHAN RN 50 from Mitsubishi Chemical Holding Groups (Wiesbaden, Germany). The hereby obtained pressure sensitive adhesive strips were cut out in the machine direction from the pressure sensitive adhesive film sample material to provide test strips with a width of 25.4 millimeters (mm) and a length of 3050 millimeters. Aluminum panels were cleaned with a 50:50 isopropanol/water mixture prior to use.

For test sample preparation, the liner was first removed from the adhesive side and the tape was applied to the clean test panel using light finger pressure. The test samples were then rolled four times with a standard FINAT test roller (weight 2.0 kg, Mecmesin Corporation, Sterling, VA at a speed of approximately 10 mm per second to obtain intimate contact between the adhesive and the surface. After applying the pressure sensitive adhesive assembly strips to the test panel, the test samples were allowed to dwell for 24 hours at ambient room temperature (23° C.+/−2° C., 50% relative humidity+/−5%) prior to testing at 85° C. or room temperature.

For 180° peel testing, the test panel was clamped in the lower movable jaw of an Instron tensile tester (Instron 3365, Instron, Norwood, MA. The pressure sensitive adhesive film strips were folded back at an angle of 180° and the free end was clamped in the upper jaw of the tensile tester in a configuration commonly utilized for 180° measurements. The tensile tester was set at 300 mm per minute jaw separation rate. Test results were expressed in Newton per mm (N/mm). The quoted peel values were the average of three 180° peel measurements.

EXAMPLES

Comparative Example 1 (CE-1)

In CE-1, 45 grams (g) of OB15, 25 g of OB80, 30 g of AP125, and 200 g of heptane were added in a glass jar. The jar was sealed and contents were mixed on a roll mixer overnight. The solution was then coated on a 50 μm thick siliconized polyester release liner, RF22N (SKC Haas, Korea) using a knife coater with a gap of 6 mil (0.15 mm). The coated sample was placed in an oven at 70° C. for 15 minutes. RF02N was then laminated onto the dried sample.

Example 1 (EX-1)

In EX-1, 45 g of OB15, 25 g of OB80, 30 g of AP125, 5 g of A353S and 200 g of heptane were added in a glass jar. The jar was sealed and contents were mixed overnight. The solution was then coated on a 50 μm thick siliconized polyester release liner, RF22N (SKC Haas, Korea) using a knife coater with a gap of 6 mil (0.15 mm). The coated sample was placed in an oven at 70° C. for 15 minutes. RF02N was then laminated onto the dried sample.

Example 2 (EX-2)

In EX-2, 45 g of OB15, 25 g of OB80, 30 g of AP125, 5 g of A350S and 200 g of heptane were added in a glass jar. The jar was sealed and contents were mixed overnight. The solution was then coated on a 50 μm thick siliconized polyester release liner, RF22N (SKC Haas, Korea) using a knife coater with a gap of 6 mil (0.15 mm). The coated sample was placed in an oven at 70° C. for 15 minutes. RF02N was then laminated onto the dried sample.

Comparative Example 2 (CE-2)

In CE-2, 45 g of OB15, 25 g of OB80, 30 g of AP125, 5 g of A250S, and 200 g of heptane were added in a glass jar. The jar was sealed and contents were mixed overnight. The A250S was insoluble in the tackifed polyisobutylene (PIB) solution. Since a miscible mixture could not be formed, the adhesive was not coated and tested.

TABLE 2

| Sample ID | Haze, % | WVTR, g/m²/day | Al adhesion, N/dm |
|-----------|---------|----------------|-------------------|
| CE-1 | 0.24 | 13.23 | 3.29 |
| EX-1 | 0.31 | — | 4.36 |
| EX-2 | 0.42 | 13.41 | 5.28 |

What is claimed is:

1. An adhesive composition comprising:
at least 50 wt. % of polyisobutylene polymer component, wherein the polyisobutylene polymer component comprises a first polyisobutylene polymer having a weight average molecular weight no greater than 150,000 g/mole and a second polyisobutylene polymer having a weight average molecular weight greater than to 300,000 g/mole;
wherein the first polyisobutylene polymer is in an amount equal to or greater than the second polyisobutylene polymer; optionally at least one tackifier;
optionally less than 10 wt. % of polymerized units at least one (meth)acryl monomer;
and a component that improves adhesion to metal consisting of polyolefin copolymer comprising polymerized units of $C_2$-$C_4$ alkylenes and a carboxylic acid or an anhydride thereof, wherein the polyolefin copolymer has an acid number of less than 40 mgKOH/g and is present in an amount up to 20 wt. % of the adhesive composition; and
wherein the adhesive composition is a pressure sensitive adhesive.

2. The adhesive composition of claim 1 wherein the polyolefin copolymer comprises at least 75 wt.-% of polymerized units of polyolefin.

3. The adhesive composition of claim 1 wherein the polyolefin copolymer has a melting temperature ranging from 50 to 150° C.

4. The adhesive composition of claim 1 wherein the polyolefin copolymer further comprises polymerized units of at least one (meth)acryl monomer.

5. The adhesive composition of claim 1 wherein the polyisobutylene polymer component comprises unfunctionalized polyisobutylene polymer.

6. The adhesive composition of claim 1 wherein the polyolefin copolymer is not covalently bonded to the polyisobutylene polymer component.

7. The adhesive composition of claim 1 wherein the polyisobutylene polymer component has an average weight average molecular weight ranging from 150,000 to 500,000 g/mole.

8. The adhesive composition of claim 1, wherein the composition further contains a UV blocking agent.

9. The adhesive composition of claim 1, wherein the adhesive composition at a thickness of 20 microns has a haze of less than 10%.

10. The adhesive composition of claim 1, wherein the adhesive composition at a thickness of 20 microns has a WVTR when measured at 40° C. and a relative humidity gradient of 90% of less than 100 $g/m^2/day$.

11. The adhesive composition of claim 1 wherein the adhesive composition comprises at least 60 wt. % of the polyisobutylene polymer component.

12. The adhesive composition of claim 1 wherein the adhesive composition exhibits a 180 degree peel to an aluminum panel of at least 1, 2, or 3 N/dm.

13. The adhesive composition of claim 1 wherein the adhesive composition exhibits a 180 degree peel to an aluminum panel of at least 4 or 5 N/dm.

14. The adhesive composition of claim 1 wherein the adhesive composition comprises tackifier in an amount no greater than 40 wt. %.

15. The adhesive composition of claim 14 wherein the tackifier is a hydrogenated aliphatic hydrocarbon tackifier.

16. An article comprising the adhesive composition of claim 1, wherein the adhesive composition is disposed on a substrate.

17. The article of claim 16 wherein the substrate is a release liner.

18. The article of claim 16, wherein the substrate is an optical film, a display unit, a touch sensor, or a lens.

\* \* \* \* \*